Sept. 20, 1966   J. SCHMENGLER   3,273,901
AXIAL SHAFT SEAL
Filed June 11, 1963
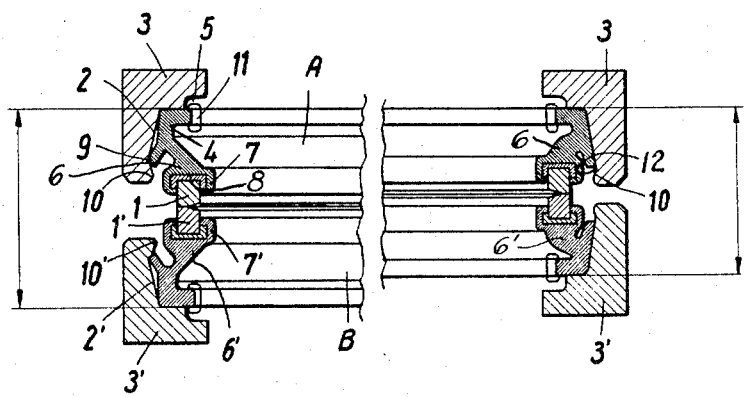
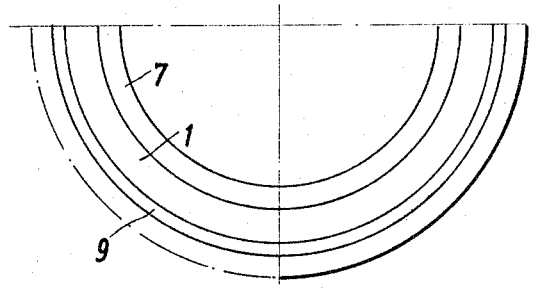

United States Patent Office 3,273,901
Patented Sept. 20, 1966

3,273,901
AXIAL SHAFT SEAL
Johann Schmengler, Gutenbergstrasse 13, Hemmingen-Westerfeld, Germany
Filed June 11, 1963, Ser. No. 287,085
3 Claims. (Cl. 277—92)

The present invention relates to an axial shaft seal, particularly for sealing track roller bearings of crawler tractors, which consists of a flexible body of elastic material and is provided with a slide ring or sealing ring which under axial compression bears against the engaging sealing face. The requirements to be met by such seals particularly in crawler tractors are high, because a considerable amount of dirt is forced into the bearing when driving through sand and mud. In known shaft seals, two sealing plates are provided enclosing the shaft which are axially pressed against each other by spiral springs, or rubber bodies are used which are formed like a bellows and rendering the same effect. All these seals have a disadvantage in that they require much space for their installation, especially when the sealing bodies are also provided with sealing rings of special steel.

It is one object of the present invention to provide an axial shaft seal, which eliminates the deficiencies of known seals by providing a sealing unit consisting of two identical sealing bodies, one of which is fixed on a stationary part of the arrangement, as the shaft for instance, and the other of which on the rotating part, the track roller, for instance.

It is another object of the present invention to provide an axial sealing ring, wherein, the flexible body, accommodating the sealing ring forms a cone-shaped shell, the narrow side of which carries the sealing ring and its wide part ends in a curb which fits snugly into a recess. The sealing ring may be made of special steel and arranged, like the engaging sealing face, on a retainer ring which is embedded in or vulcanized to the flexible body and into which the sealing ring is cemented or fixed otherwise. The curb securing the sealing body in the bearing preferably consists of the same material as the flexible body, i.e. they are made of one piece. The curb may be provided with a reinforcing member, a metal ring, a plastic ring, or the like.

The flexible body with its cone-shaped shell is a particularly suitable design. To retain the body in the recess and to secure it against rotation, the present invention provides a collar, ring, lip, or the like on its outside to project outwardly and to fit into a recess in the bearing, when compressing the seal in axial direction. The root of the curb in the cone-shaped shell and the outwardly projecting collar, ring, or the like form a lever arrangement, in which the cone-shaped shell engages at the joint, so that upon axial pressure on the sealing ring the parts of the flexible body which form the toggle joint reach their stretched position and are forced into the recess.

With these and other objects in view which will become apparent from the following detailed description, the present invention will be clearly understood in connection with the accompanying drawings, in which:

FIGURE 1 is a sectional view through the sealing unit in relieved condition;

FIG. 2 is a sectional view through the same sealing unit in mounted condition; and FIG. 3 is a part top plan view of the sealing body.

Referring now to the drawing, the sealing unit comprises of two sealing bodies A and B, both shaped like a ring and, to be rendered effective, are compressed in axial directions, so that their sealing rings 1 and 1', of special steel for instances, rest smoothly on each other. The effect of the axial compression can be seen by comparing FIGS. 1 and 2. The sealing body A, for instance, is arranged in a recess 2 of a support member 3 fixed on a shaft, while the sealing body B is fitted in a recess 2' of a support member 3' which is provided on a track roller, for instance.

The sealing bodies are made of elastic material, as rubber, plastic material, or the like, and a cylindrical collar 4 of a curb 5 is followed by a cone-shaped shell 6 projecting towards the inside. The end 7 of the shell 6 embraces a retainer ring 8 into which the sealing ring 1 is cemented.

Where the collar 4 ends in the cone-shaped shell 6, there is provided a lip, a ring, a collar 9, or the like, which fits into a groove 12 defined in the recess 2 of the support member 3 and bears against a projection 10.

The second sealing body is of identical shape and dimensions. Corresponding parts have the same reference numbers and are marked with a prime ('). A reinforcing ring 11 may be provided on the inside of the curb 5, if necessary.

As can be seen from FIG. 2, the cone-shaped shells 6 and 6' are bent in when compressed axially. The collar 4 and the projecting lip 9 on the cone-shaped shell 6 form a double lever arrangement. The shell 6 is adjacent the joint of the two elements. When axial pressure is applied on the sealing ring 1 the double lever is transferred into its stretched position, since the parts 5 and 9 are forced into the recesses 2 and 2' under considerable pressure. The sealing unit is thus secured against rotation.

On the other hand, the lip 9 and the part 7 embracing the retainer ring 8, are adapted to have such dimensions that the lip 9 bears against the part 7 from outside, as can be seen from the FIG. 2, preventing dirt and foreign matter from entering the flexible body. Otherwise, foreign matter might impair the elasticity of the flexible body.

While I have disclosed one embodiment of the present invention, it is to be understood that this embodiment is given by example only and not in a limiting sense, the scope of the present invention being determined by the objects and the claims.

I claim:
1. An axial shaft seal, particularly for sealing track roller bearings of crawler tractors, comprising
   two flexible annular sealing bodies of elastic material of a truncated cone configuration,
   a sealing ring secured to each of said sealing bodies,
   said sealing rings engaging each other,
   support members having a recess,
   each of said support members receiving the corresponding of said sealing bodies in said recess,
   said support members having an annular groove at their inner face,
   said sealing bodies having a collar received in and supported by the corresponding groove of said support members,
   said recess in said support members being of conical shape,
   said collar of said sealing rings being likewise of conical shape, said collar being inwardly bent in its cross-section, and said sealing bodies extending inwardly and joining said collar such that upon axial pressure on said sealing rings the cross-section of said collar is stretched, simultaneously engaging the inner side walls of the recess in said support members.

2. The axial shaft seal, as set forth in claim 1, wherein the inner diameter of said collar is greater than the outer diameter of said sealing ring in order to permit entering of said sealing ring into said collar, upon exerting of axial pressure.

3. The axial shaft seal, as set forth in claim 1, wherein said sealing bodies each have a second collar with reinforcing means.

References Cited by the Examiner

UNITED STATES PATENTS

| | | | |
|---|---|---|---|
| 2,600,516 | 6/1952 | Pielop | 277—235 X |
| 3,007,724 | 11/1961 | Amirault et al. | 277—88 X |
| 3,180,648 | 4/1965 | Kupfert et al. | 277—92 |
| 3,185,488 | 5/1965 | Christensen et al. | 277—42 |

FOREIGN PATENTS

| | | |
|---|---|---|
| 1,324,238 | 3/1963 | France. |
| 1,101,071 | 3/1961 | Germany. |
| 774,221 | 5/1957 | Great Britain. |

LAVERNE D. GEIGER, *Primary Examiner.*

J. MEDNICK, *Assistant Examiner.*